(12) United States Patent
Delamare

(10) Patent No.: US 9,733,960 B2
(45) Date of Patent: Aug. 15, 2017

(54) COMMUNICATIONS NETWORK AND A NETWORK TERMINAL

(75) Inventor: Andrew Delamare, London (GB)

(73) Assignee: EN-TWYN LIMITED, London (GB)

( * ) Notice: Subject to any disclaimer, the term of this patent is extended or adjusted under 35 U.S.C. 154(b) by 324 days.

(21) Appl. No.: 14/117,356

(22) PCT Filed: May 11, 2012

(86) PCT No.: PCT/GB2012/000432
§ 371 (c)(1),
(2), (4) Date: Apr. 16, 2014

(87) PCT Pub. No.: WO2012/156664
PCT Pub. Date: Nov. 22, 2012

(65) Prior Publication Data
US 2014/0337843 A1  Nov. 13, 2014

(30) Foreign Application Priority Data

May 13, 2011  (GB) .................................. 108053.8 0

(51) Int. Cl.
*G06F 3/00* (2006.01)
*G06F 9/455* (2006.01)
(Continued)

(52) U.S. Cl.
CPC ............ *G06F 9/45533* (2013.01); *G06F 9/54* (2013.01); *H04B 3/542* (2013.01); *H04L 29/06* (2013.01); *H04L 47/828* (2013.01)

(58) Field of Classification Search
CPC .................................. G06F 9/54; H04L 29/06
(Continued)

(56) References Cited

U.S. PATENT DOCUMENTS 7,327,221 B1 * 2/2008 Callaghan .............. H04B 3/542
340/12.32
2005/0017848 A1  1/2005 Flen et al.
(Continued)

FOREIGN PATENT DOCUMENTS

EP  1244326  9/2002
GB  2450904 A * 1/2009  ......... H01R 13/6658
(Continued)

OTHER PUBLICATIONS

Karun, Communication Blades: Modular Communications for Tangible and Embedded Interfaces, Dec. 2006.*
(Continued)

*Primary Examiner* — Lechi Truong
(74) *Attorney, Agent, or Firm* — Maschoff Brennan

(57) ABSTRACT

A power line communication network, comprising: a plurality of network terminals and at least one power line, wherein each terminal is coupled to said at least one power line such that the terminals are interconnected. Each terminal comprises: a power line interface; at least one processor and at least one memory; a plurality of resources that include at least one signal input and/or signal output; wherein at least one of said terminals has computer code that includes an operating system for controlling the power line communication network, the operating system including: a control layer for controlling access to the processor, memory and resources of each terminal; a virtual machine interface through which virtual machines can access said resources; and a virtual machine manager for controlling access to said resources, wherein said virtual machine manager accesses said resources through the control layer.

14 Claims, 12 Drawing Sheets

(51) Int. Cl.
*G06F 9/54* (2006.01)
*H04B 3/54* (2006.01)
*H04L 29/06* (2006.01)
*H04L 12/911* (2013.01)

(58) Field of Classification Search
USPC .......................................... 719/310; 709/225
See application file for complete search history.

(56) References Cited

U.S. PATENT DOCUMENTS

| | | | |
|---|---|---|---|
| 2005/0086523 A1* | 4/2005 | Zimmer ................ | G06F 21/554 726/4 |
| 2005/0114855 A1* | 5/2005 | Baumberger ....... | G06F 9/45558 718/1 |
| 2005/0204357 A1* | 9/2005 | Garg ..................... | G06F 9/4426 718/1 |
| 2007/0046492 A1 | 3/2007 | Fair et al. | |
| 2008/0005447 A1* | 1/2008 | Schoenberg .......... | G06F 12/109 711/6 |
| 2009/0276771 A1 | 11/2009 | Nickolov et al. | |
| 2010/0162238 A1* | 6/2010 | Warfield ............. | G06F 9/45533 718/1 |
| 2011/0061050 A1* | 3/2011 | Sahita ................ | G06F 9/45533 718/1 |
| 2014/0201422 A1* | 7/2014 | Tseng .................. | G06F 9/45558 711/102 |

FOREIGN PATENT DOCUMENTS

| | | |
|---|---|---|
| WO | 2007050797 | 5/2007 |
| WO | 2008090341 | 7/2008 |
| WO | 2009/007730 A2 | 1/2009 |
| WO | WO 2009/007730 A2 | 1/2009 |

OTHER PUBLICATIONS

UK Search Report dated Aug. 25, 2011 as received in Application No. GB1108053.8, 3 pgs.
International Search Report, PCT/GB2012/000432, Jul. 16, 2012, 13 pgs.
European Examination Report dated Apr. 5, 2017 in application No. 12 720 932.8.

* cited by examiner

COMMUNICATIONS NETWORK AND A NETWORK TERMINAL

CROSS-REFERENCE TO RELATED APPLICATIONS

This application claims the benefit of priority under 35 U.S.C. 119(e) to PCT/GB2012/000432, filed May 11, 2012, titled A COMMUNICATIONS NETWORK AND A NETWORK TERMINAL, which claims the benefit of priority under 35 U.S.C. 119(b) to GB Patent Application No. 1108053.8, filed May 13, 2011, titled A COMMUNICATIONS NETWORK AND A NETWORK TERMINAL, both of which are incorporated herein by reference in their entireties.

FIELD OF THE INVENTION

The present invention relates to a communications network and a network terminal. In particular, it relates to a communications network and terminal which use power line communications.

BACKGROUND TO THE INVENTION

Power line communications systems allow communications signals to be transmitted over power cables. A carrier signal is modulated with a communications signal and transmitted from one point on a cable to another point. Various systems and standards of power line communications exist for use in the home and office environment. For example, HomePlug is the name of a family of standards aimed at providing additional networking in the home environment.

A typical HomePlug unit takes the form of an adapter, which is plugged into an existing power wall socket. The adapter includes a port for receiving a communications signal. The adapter includes a powerline processor for placing the communications signals on to the power cables. Ethernet is typically used as the communications system.

Alternative devices to adapters include power socket fascias such as those disclosed in GB 2,450,904 A, which is a UK patent application in the name of the applicant, En-Twyn Limited. The contents of GB 2,450,904 A are incorporated herein by reference. In such a fascia, the communications port is formed in the front face of a standard power wall socket. The powerline processor and other components are formed behind the fascia. Such a device has the benefit of removing the clutter produced by adapter devices, while also making the power sockets in the fascia available to other devices.

In these prior art devices, communications between a device connected at one point, and a device connected at another point, is generally point-to-point. WO 2009/007730 A2, in the name of the applicant, discloses a power socket fascia, which includes power line communications equipment and an operating system. The contents of WO 2009/007730 are also incorporated herein by reference. The inclusion of an operating system allows for more sophisticated network control.

There is a need for power line communications networks with improved network capabilities and functionality.

SUMMARY OF THE INVENTION

In a first aspect, the present invention provides a power line communication network, comprising: a plurality of network terminals and at least one power line, wherein each terminal is coupled to said at least one power line such that the terminals are interconnected, and each terminal comprises: a power line interface, for transferring signals to and from said at least one power line and between said network terminals; at least one processor and at least one memory, wherein said processor is for processing computer code and said memory is for storing computer code; and a plurality of resources, wherein said resources include at least one signal input and/or signal output; wherein at least one of said terminals has computer code stored thereon and the computer code includes an operating system for controlling the power line communication network, the operating system including: a control layer for controlling access to said at least one processor, said at least one memory and said resources of each terminal; a virtual machine interface through which virtual machines can access said resources; and a virtual machine manager for controlling access by virtual machines to said resources, wherein said virtual machine manager accesses said resources through the control layer.

In a first aspect, the present invention provides a power line communication network, comprising: a plurality of network terminals and at least one power line, wherein each terminal is coupled to said at least one power line such that the terminals are interconnected, and each terminal comprises: a power line interface, for transferring signals to and from said at least one power line and between said network terminals; at least one processor and at least one memory, wherein said processor is for processing computer code and said memory is for storing computer code; and a plurality of resources, wherein said resources include at least one signal input and/or signal output; wherein at least one of said terminals has computer code stored thereon and the computer code includes an operating system for controlling the power line communication network, the operating system including: a control layer for controlling access to said at least one processor, said at least one memory and said resources of each terminal; wherein said control layer distributes processing of elements of the operating system across the processors of the terminals connected to the network.

In a first aspect, the present invention provides a power line communications network having a plurality of network terminals which include power socket fascias, each terminal having at least one processor, wherein the network is controlled by an operating system and processing of elements of the operating system is distributed across the processors of the network terminals.

In a first aspect, the present invention provides a power line communications network having a plurality of network terminals which include power socket fascias, each terminal having at least one processor and at least one resource, wherein the network is controlled by an operating system which includes a control layer and access to said resources is controlled by said control layer.

In a first aspect, the present invention provides a network terminal for use in a power line communications network, the terminal comprising: a power line interface, for transferring signals to and from a power line; at least one processor and at least one memory, wherein said processor is for processing computer code and said memory is for storing computer code; and a plurality of resources, wherein said resources include at least one signal input and/or signal output; wherein said processor is arranged to process computer code which includes an operating system for controlling the power line communications network, the operating system including: a control layer for controlling access to said at least one processor, said at least one memory and said resources of a terminal; a virtual machine interface through which virtual machines can access said resources; and a virtual machine manager for controlling access by virtual machines to said resources, wherein said virtual machine manager accesses said resources through the control layer.

In a first aspect, the present invention provides a network terminal for use in a power line communications network, the terminal comprising: a power line interface, for transferring signals to and from a power line; at least one processor and at least one memory, wherein said processor is for processing computer code and said memory is for storing computer code; and a plurality of resources, wherein said resources include at least one signal input and/or signal output; wherein said processor is arranged to process computer code which includes an operating system for controlling the power line communications network, the operating system including: a control layer for controlling access to said at least one processor, said at least one memory and said resources of each terminal; wherein said control layer distributes processing of elements of the operating system and other computer code across the processors of the terminals connected to the network.

In a first aspect, the present invention provides a computer program or suite of computer programs for use with a power line communication network, the network comprising: a plurality of network terminals and at least one power line, wherein each terminal is coupled to said at least one power line such that the terminals are interconnected, and each terminal comprises: a power line interface, for transferring signals to and from said at least one power line and between said network terminals; at least one processor and at least one memory, wherein said processor is for processing said computer program or said suite of computer programs and said memory is for storing said computer program or said suite of computer programs; and a plurality of resources, wherein said resources include at least one signal input and/or signal output; wherein the computer program or suite of computer programs includes an operating system including: a control layer for controlling access to said at least one processor, said at least one memory and said resources of each terminal; a virtual machine interface through which virtual machines can access said resources; and a virtual machine manager for controlling access by virtual machines to said resources, wherein said virtual machine manager accesses said resources through the control layer.

In a first aspect, the present invention provides a computer program or suite of computer programs for use with a power line communication network, the network comprising: a plurality of network terminals and at least one power line, wherein each terminal is coupled to said at least one power line such that the terminals are interconnected, and each terminal comprises: a power line interface, for transferring signals to and from said at least one power line and between said network terminals; at least one processor and at least one memory, wherein said processor is for processing said computer program or suite of computer programs and said memory is for storing said computer program or suite of computer programs; and a plurality of resources, wherein said resources include at least one signal input and/or signal output; wherein the computer program or suite of computer programs includes an operating system including: a control layer for controlling access to said at least one processor, said at least one memory and said resources of each terminal; wherein said control layer distributes processing of elements of the operating system and other computer code across the processors of the terminals connected to the network.

Further features of the invention are described in the appended claims.

BRIEF DESCRIPTION OF THE DRAWINGS

Embodiments of the invention will now be described, by way of example only, and with reference to the accompanying drawings, in which.

DETAILED DESCRIPTION OF EMBODIMENTS OF THE INVENTION

Figure 1:
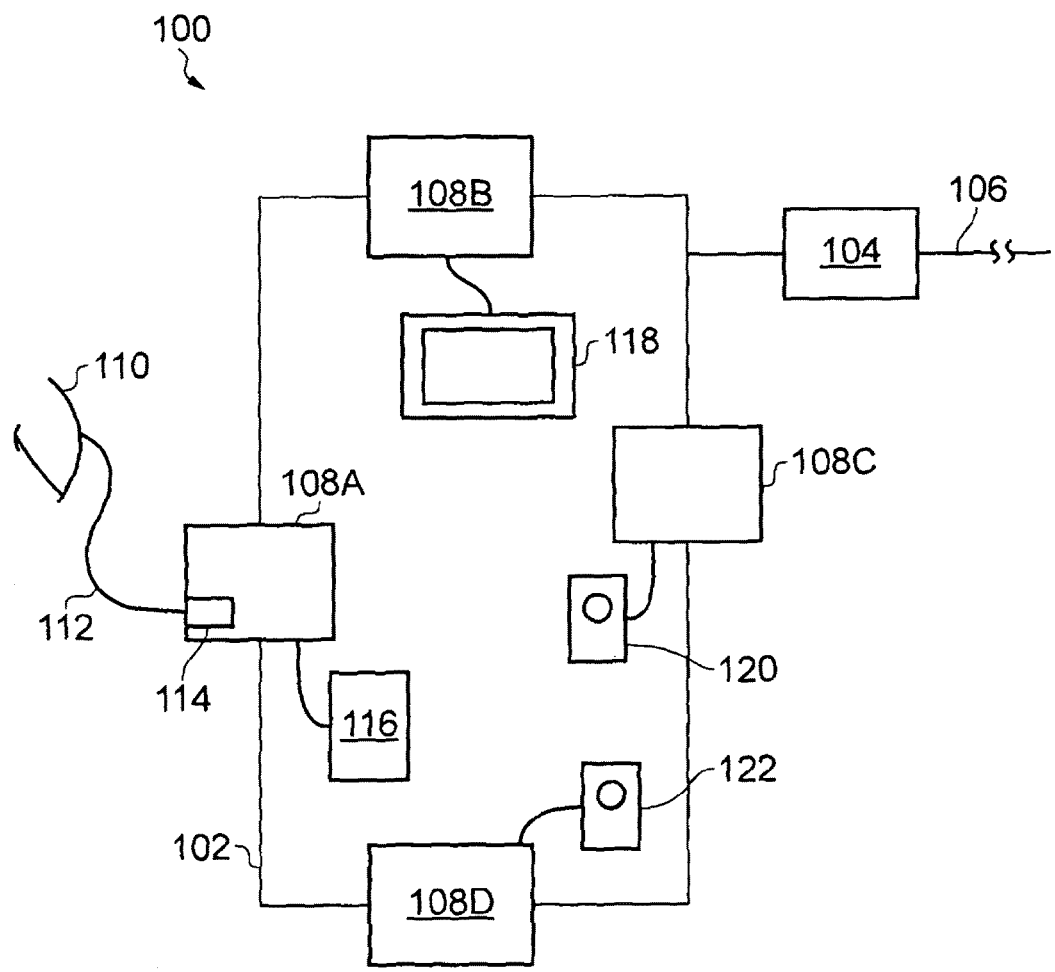
FIG. 1 shows a communications network in accordance with an embodiment of the present invention.

FIG. 1 shows a communications network 100 in accordance with an embodiment of the present invention. The network 100 is a power line network. Accordingly, the physical layer of the network is the power cable infrastructure of a building, such as a home or office. In FIG. 1, the details of the building in which the network is placed are omitted for clarity. The network 100 includes power cable infrastructure in the form of a power cable 102. The power cable 102 is shown here as a single cable, but in practise would be made of various cables, typically in the form of a ring main. These cables are formed in the walls or other spaces of a building. The power cable 102 passes through wall boxes (not shown) located in the walls of the building. The wall boxes may take the form of the standard wall boxes found in most buildings in which power socket fascias are typically located. The power cables 102 are connected to a customer unit 104 where they are coupled to a mains power source 106. The network 100 also includes a plurality of network terminals 108A, 108B, 108C, 108D. The terminals 108A-108D are located, in this example, within the wall boxes of the building and typically may comprise of a power socket with an Ethernet port or other communications port (e.g. HDMI). Each terminal is coupled to the power cables within the wall box.

Figure 2:
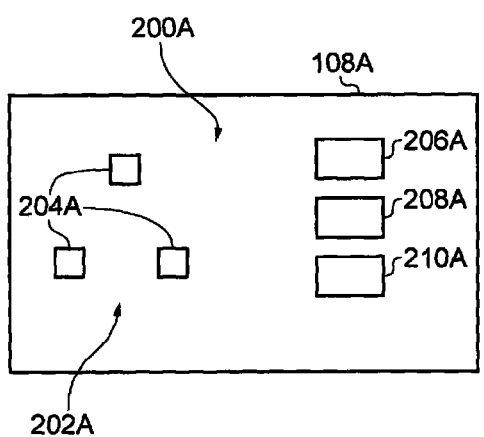
FIG. 2 shows a network terminal in accordance with an embodiment of the present invention.

FIG. 2 is a diagram of the front face of the network terminal 108A. The front faces of the other terminals 108B-108D may have the same appearance as the front face of terminal 108A. The terminal includes a power socket fascia 200A, which includes a power socket 202A. In this case, the power socket 202A is a three-hole power socket with the holes 204A arranged in the standard format used in the United Kingdom. The fascia 200A also includes a television output port 206A, such as an HDMI port. The fascia 200A also includes a data port 208A, such as a USB 3.0 port. In addition, the fascia 200A includes an audio out port 210A.

Other types of power socket conforming to standard formats in countries other than the UK may be used. A network terminal 108A may not include a power socket where the local standard format of wall boxes does not allow sufficient space for both a power socket and/or a television output port 206A and/or a data port 208A and/or an audio out port 210A.

Figure 3:
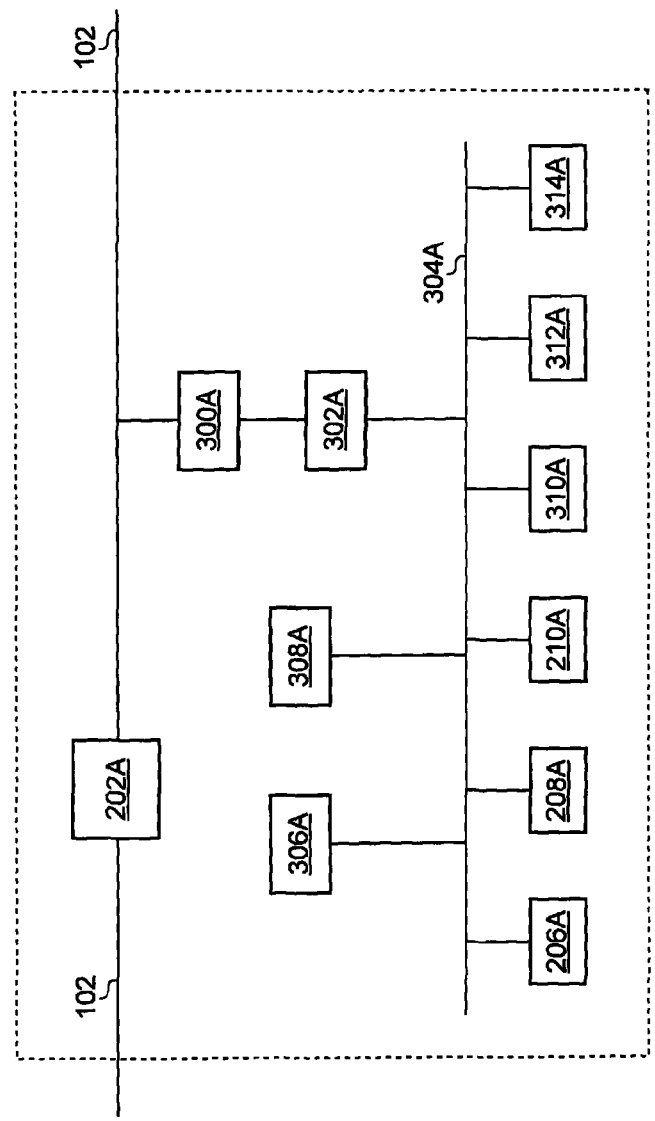
FIG. 3 is a schematic diagram of a network terminal in accordance with an embodiment of the present invention.

FIG. 3 is schematic diagram of the network terminal 108A. The terminal 108A includes the power socket 202A which is coupled to power cables 102. The terminal 108A also includes a power line interface 300A and an Ethernet interface 302A. The power line interface 300A has a power line processor (not shown) and is coupled to the power cables 102. The power line interface 300A sends and receives signals from the Ethernet interface 302A and transfers them to and from the power cables 102.

The terminal 108A also includes a data bus 304A. The data bus is used to carry data between the various components of the terminal 108A. The terminal 108A also includes a central processing unit (CPU) 306A and memory 308A. The CPU 306A may be a twin-core processor and the memory 308A may be 8 Gb of RAM. The CPU 306A and memory are also coupled to the data bus 304A. The CPU 306A controls the operation of the terminal 108A. The terminal 108A also includes the television output port 206A, the data port 208A and the audio port 210A. In addition, the terminal includes a WiFi unit 310A, an RFID unit 312A, a cartridge slot 314A and a Bluetooth unit 316A. Each of these elements is coupled to the data bus 304A.

Returning to FIG. 1, the network 100 also includes a television satellite dish 110. The satellite dish 110 is connected to satellite cable 112 which is coupled to a satellite cartridge 114. The satellite cartridge 114 is located in cartridge slot 314A of terminal 108A. The satellite dish 110 is for providing television signals to televisions or storage devices attached to the network 100. The network 100 also includes a network-attached storage (NAS) 116. NAS 116 is attached to data port 208A of network terminal 108A. The NAS 116 is for storing data such as video and audio for streaming to devices connected to the network 100. The network 100 also includes a television 118 which is connected to television output port 206B of network terminal 108B. The television is for displaying video received from sources such as the satellite dish 110 and the NAS 116. The network 100 also includes speakers 120, 122 which are attached to the audio ports 210C, 210D. These speakers are for playing audio received from sources such as the NAS 116. The various devices and services available at each terminal are generally referred to as resources. The operation of the network will be described in more detail below.

Figure 4:
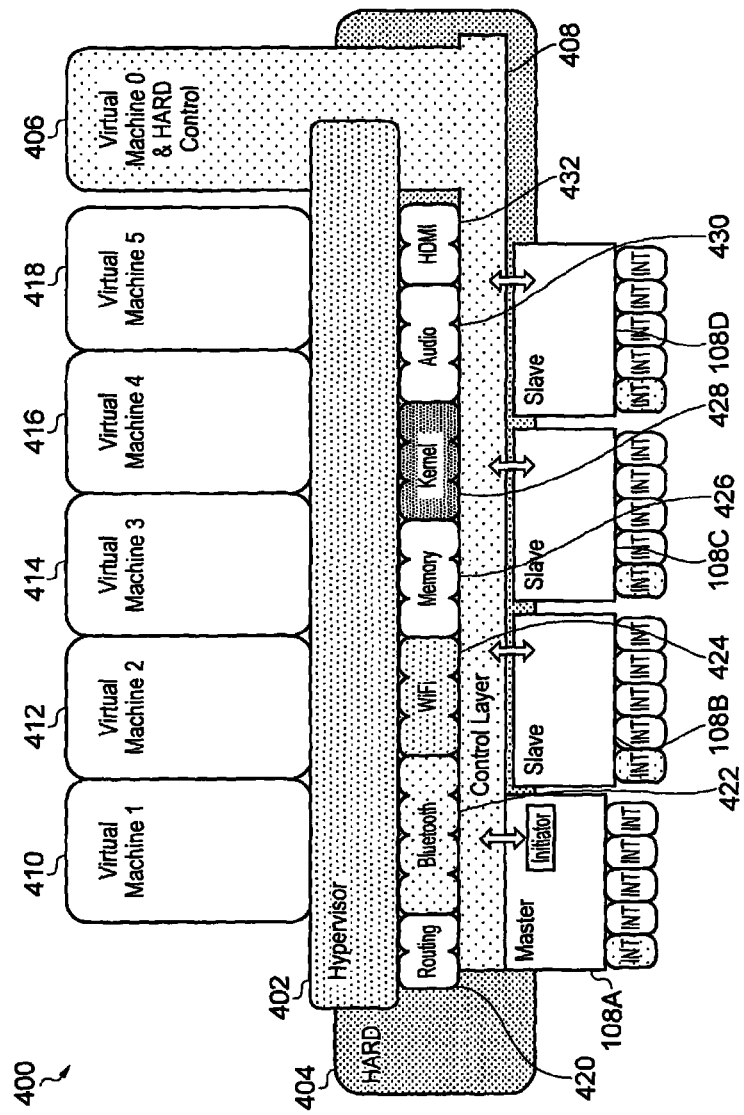
FIG. 4 is a system diagram of the operating system for use with the network of FIG. 1.

FIG. 4 shows a system diagram of an operating system 400 for use with the network 100 in accordance with an embodiment of the invention. The operating system 400 is effectively controlled by one of the network terminals 108A-108D, that terminal being termed a master terminal. However, processing of the operating system at runtime is distributed across the terminals. The upper layers of the operating system present the resources available across the terminals as a single machine, having multiple inputs and) outputs.

The operating system 400 includes a hypervisor 402, which is a virtual machine manager. The operating system 400 also includes a Hardware Abstraction & Resource Distributor (HARD) 404. The hypervisor 402 is effectively the top layer of the operating system and acts as an interface between virtual machines and the HARD 404. In this case, the operating system 400 includes six virtual machines (VMs). VM zero 406 is for controlling the HARD 404 and provides a control layer 408 within the HARD 404. The control layer 408 acts as an interface between the hypervisor inputs and the resources of the terminals 108A-108D. The operating system 400 also includes VM one 410 to VM five 418. These VMs may be third party applications. For example, VM one 410 is a satellite television VM. VM two 412 is an audio player VM. The satellite television VM 410 controls the distribution of television signals from the satellite dish 110. The audio player VM 412 controls the distribution of audio from the NAS 116 to the speakers 120, 122. The VMs communicate with the hypervisor via an application programming interface (API) (not shown). Further details of these VMs will be provided below.

The HARD 404 is effectively a hardware management layer and is responsible for managing the resources of the terminals 108A-108D. The resources of each terminal communicate their availability to the HARD 404. The HARD 404 manages the resources and provides information about them to the hypervisor 402. The HARD 404 is also responsible for handling requests from the hypervisor 402 for access to resources in the network terminals 108A-108D.

In use, one of the terminals 108A-108D takes on the role of a master terminal. In this case, terminal 108A is the master terminal. In order to determine which terminal takes on the role of the master terminal, each terminal generates a random number and publishes it to every other terminal. All terminals store the numbers of the other units in a table. The master terminal is the one with the lowest number. If the master terminal dies or becomes unstable for any reason, the second lowest number becomes the master terminal.

The HARD 404 manages devices, such as satellite dish 110, which are connected to the ports of each terminal 108A-108D, as well as devices internal to each terminal such as the RFID unit 312A and the WiFi unit 310A. The HARD 404 presents such devices as resources to the hypervisor 402, as mentioned above. When resources are available, they advertise this fact to the HARD 404, which stores this information. The HARD 404 also monitors how resources are being used and stores this information. Accordingly, if a virtual machine requires certain resources, the hypervisor 402 sends a request to the HARD 404, which knows whether or not those resources are available.

Each terminal 108A-108D is shown in FIG. 4. The representations in FIG. 4 are logical, rather than physical. Terminal 108A is shown as the master terminal (although this could be any of the terminals) and terminals 108B-D are shown as slave terminals. Each terminal is shown having a plurality of interfaces, which represent the different resources available at those terminals. Each terminal communicates with the control layer 408 of the HARD 404, as shown in FIG. 4. Further details of these communications will be provided below.

The HARD 404 maintains a list of all of the resources which are available across the network. This is shown as logical resources within the HARD 404 in FIG. 4. The HARD 404 includes logical routing resources 420, logical Bluetooth™ resources 422, logical WiFi resources 424, logical memory resources 426, logical kernel resources 428, logical audio resources 430 and logical high definition multimedia interface (HDMI) resources 432. The way in which these lists of resources are maintained will be described in more detail below.

The HARD 404 will now be described in more detail. The HARD 404 is a kernel level software logical device that controls all resources in the individual network terminals 108A-D and gathers them together into one unified structure that looks like a large machine to the hypervisor 402.

The HARD 404 has three primary roles to play. The first role is to advertise all of the resources available across the network 100 to the hypervisor 402. As noted above, this is done by nominating one of the terminals (in this case terminal 108A) as a master device. All of the other terminals 108B-D advertise their resources to it. The HARD 404 advertises those resources collectively as a general resource to the hypervisor 402. The HARD 404 communicates with the network terminals 108A-D using a lightweight protocol such as XML. Each network terminal continuously advertises its resources to the HARD 104. Resources may also be used locally, by the network terminal. Accordingly, the terminals advertise resource availability continuously as resources may be withdrawn at any time, and the HARD 404 must be kept informed of this.

The second role of the HARD 404 is to be a resource broker. At the point at which the hypervisor 402 needs a resource, it uses the HARD 404 to set up a point-to-point connection to the required network terminal using a tunnel driver. This is a dedicated link to the resource on the local network terminal. If the resource in question has the ability to report on multiple devices (e.g. a camera or a meter reading device) then it uses local resources (i.e. resources in the network terminal) to capture the output. The information collected by the terminal is presented to the HARD 404 a device. For example, a photo or video stream is collected and stored locally by the network terminal.

The third role of the HARD 404 is to manage memory and processor resources for the hypervisor 402. The HARD includes the control layer 408, or controller, which keeps a record of how much processing power is available in each network terminal 108A-D. It uses kernel tunnel drivers between the kernels over the network to send packages of work between the network terminals. The HARD 404 includes a kernel scheduler which prioritises the packets of work. The control layer 408 also requests memory blocks alongside these requests to make sure that the blocks of requested work can be processed in memory. Once the block of work is completed it is passed back to the hypervisor 402. The HARD 404 runs in parallel to a master kernel in the hypervisor 402. All slaved network terminals report their current utilization levels for various key resources (such as processor load and memory usage) to the HARD 404 on a very frequent basis via lightweight protocols such as XML.

The HARD 402 communicates to the hypervisor 404 using inter-kernel processes (IPCs). Enforcement of IPC structures makes sure that what is requested gets its own pipe and shared memory is observed effectively.

The network terminals 108A-D are able to operate in two primary operating system modes, as already noted. The first mode is the master mode. In master mode the terminal takes control of the HARD 404 and starts a message passing interface gateway to all slave terminals. The master terminal also controls the hypervisor 402, resourcing and the interfaces in and out of the virtual machines 406-418. The second mode is the slave mode. In slave mode the terminal is controlled by the master terminal. The slave terminal's processing and memory access are handed off to the master socket, and effectively become an extension of the master.

Figure 5:
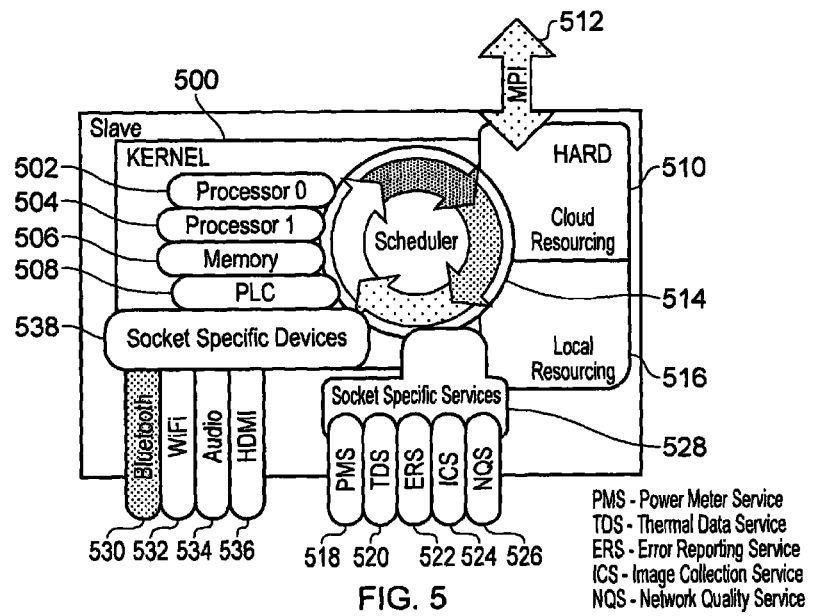
FIG. 5 is a logical diagram of the elements of a slave terminal for use with the network of FIG. 1.
Figure 6:
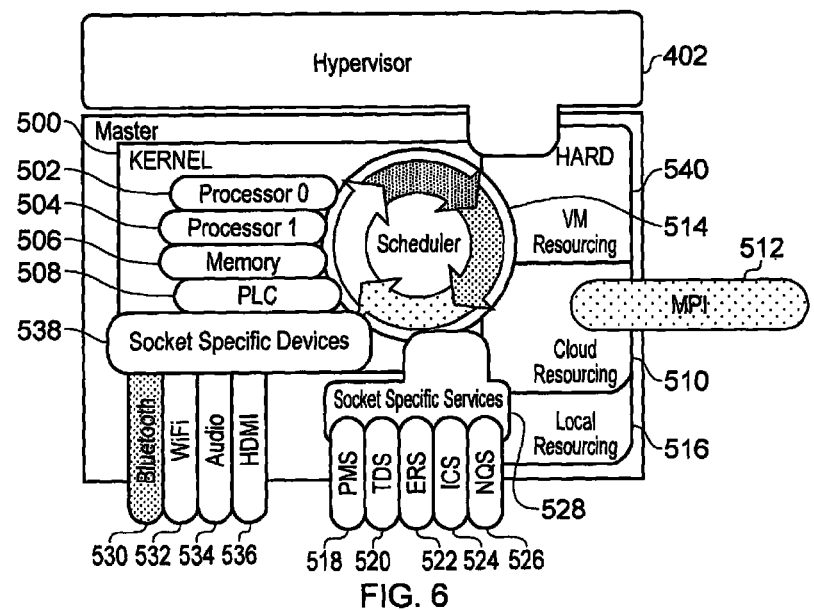
FIG. 6 is a logical diagram of the elements of a master terminal for use with the network of FIG. 1.

FIG. 5 is a logical diagram of a network terminal operating in slave mode. FIG. 6 is a logical diagram of a network terminal operating in a master mode. As already mentioned, any of the terminals 108A-D can act as a master or as a slave. For the purposes of this example, the terminal 108A is the master, and the terminals 108B-D are the slaves. The features which are common to terminals operating in both modes will be described first. Each unit includes a kernel 500, which is part of the HARD 404. The kernel 500 uses the Android™ platform. The CPU, memory and power line interfaces are all standard functions for all units and they all have kernel drivers. These drivers are for use with the CPU 306A, the memory 308A and the power line interface 300A of the terminals 108A-D. In this case, there is a first processor driver 502, second processor driver 504, memory driver 506 and powerline interface driver 508. There are two processor drivers owing to the use of two processors within the CPU 306A.

Each terminal also includes HARD 404 modules. In particular, there is a cloud resourcing module 510 which provides cloud resourcing services. The cloud resourcing module 510 communicates via a message passing interface (MPI) 512 (based on the Open MPI Project: http://www.open-mpi.org) with the control layer 408 and the cloud resourcing modules 510 of the other terminals. The MPI layer 512 provides challenge response messages between the slave terminals and the master terminal. The terminals also include a scheduler 514. The cloud resourcing module 510 interprets challenge response messages and passes them into the kernel 500 and also makes sure that the scheduler 514 has the resources to cater for what is required by the current task. The resources are represented by a resourcing layer which constantly advertises what's available in each slave terminal to the master terminal using MPI message sets.

The terminals also include a local resourcing module 516. The local resourcing module 516 is the local machine controller. The local resourcing module 516 is part of the HARD 404. This makes is easier for the resource allocation to be changed should remote resourcing be required. When local resourcing is required, the local resourcing module 516 puts a soft order into the scheduler 514 to block off the resource. This then stops it being used by remote applications.

The terminals 108A-D also include a number of local service modules which can be run from each terminal. For example, the terminals include a power meter service module 518, a thermal data service module 520, an error reporting service module 522, an image collection service module 524 and a network quality service module 526. Each of these modules communicate with the HARD 404 via a local service interface 528. Each of the local service modules include a particular device (e.g. a power meter) and software to process what is coming from the device. They provide a service that can be read or requested by the HARD 404 master terminal.

The terminals also include terminal specific devices. In this case, the terminal includes a Bluetooth™ driver 530 (corresponding to Bluetooth™ unit 316A), a WiFi driver 532 (corresponding to WiFi unit 310A), an audio driver 534 (corresponding to audio port 210A) and an HDMI driver 536 (corresponding to television output 206A). Other drivers may be provided (but are not shown) relating to other ports and units. Each terminal also includes a local devices interface 538. The HARD 404 allocates local devices in two ways. Firstly, they can be soft allocated. In other words, they are allocated for a period of time immediately or a period of time scheduled in the future. Secondly, they can be hard allocated. In other words, they are allocated specifically to a virtual machine as a direct connection.

As noted above, the master socket is chosen using random number generation. Every socket is capable of being the master socket. Once the master process has been started, the master socket starts new processes. Before the master terminal starts is master terminal processes, it checks its a local services daemon to make sure all local services are catered for. Once the master terminal has started and carried out any required sanity checks, it starts a new HARD process called cloud resourcing. This is the cloud resourcing module 510. The cloud resourcing process starts up the control layer 408 referred to above. The control layer 408 is MPI-based. It records all of the slave terminals against the shared table it received and then creates a resource table (not shown).

Once all of the slave terminals are online and have broadcast what they have to the master terminal, the master terminal carries out a stability check to ensure that devices are available. The HARD 404 starts a virtual machine resourcing engine 540. The resourcing engine 540 starts up and validates itself as it if were one large machine. It runs a number of speed and sanity tests to make sure that all devices meet the minimum speed and stability requirements, much like when a personal computer starts.

The master terminal 108A then starts the control VM 406 which in turn starts the HARD control layer 408. The control VM 406 in turn starts the virtual machines one by one making sure resourcing has been validated. In FIG. 4, each terminal is shown with their own resources. All resources, devices and services available at each socket including processing power, memory management, physical devices, virtual devices and any services that are available locally on the terminal are put into a service catalogue (not shown). Once the service catalogue is built it gets checked constantly by the HARD 404 to see if a resource is available. When a resource is available, it gets advertised to the hypervisor 402. If a resource becomes unavailable it gets removed from the catalogue. If an advertised resource is used by the hypervisor 402, the HARD 404 changes the resources state to "locked". If the local terminal uses a resource it changes state to "unavailable locked".

Figure 7:
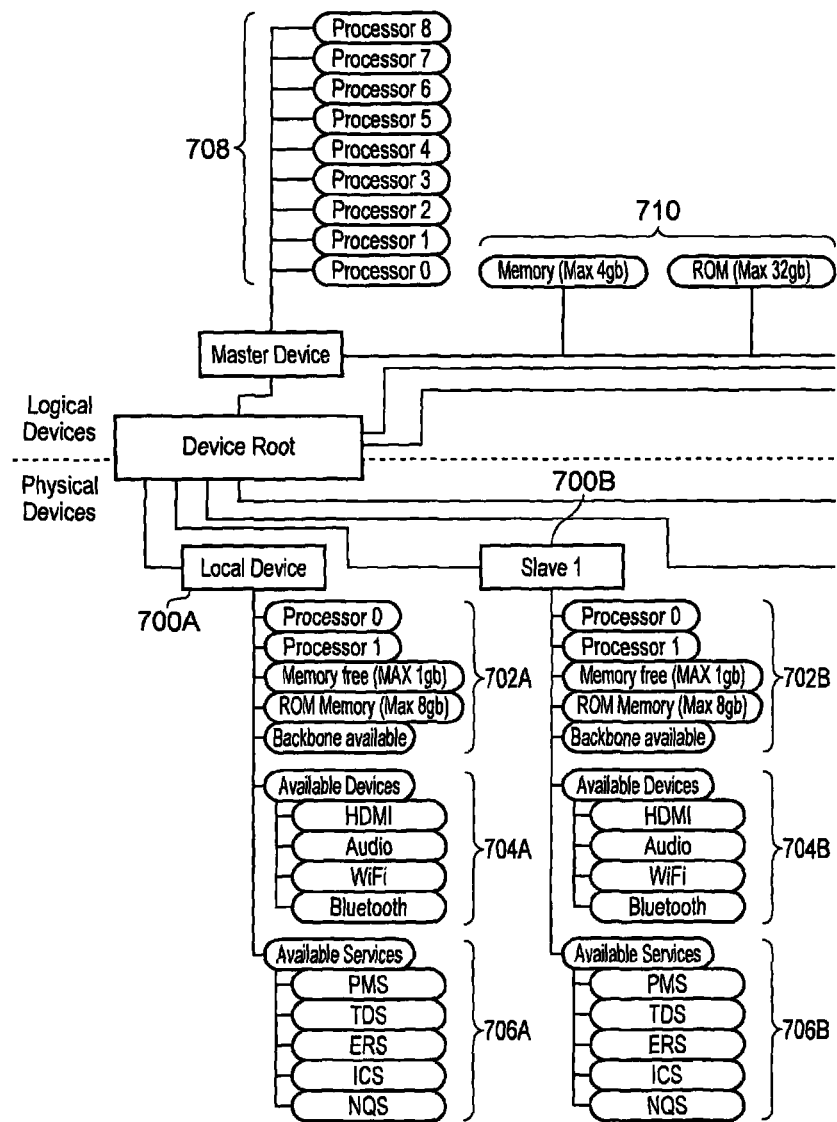
FIG. 7 is a diagram of the logical and physical elements the network of FIG. 1.
Figure 7:
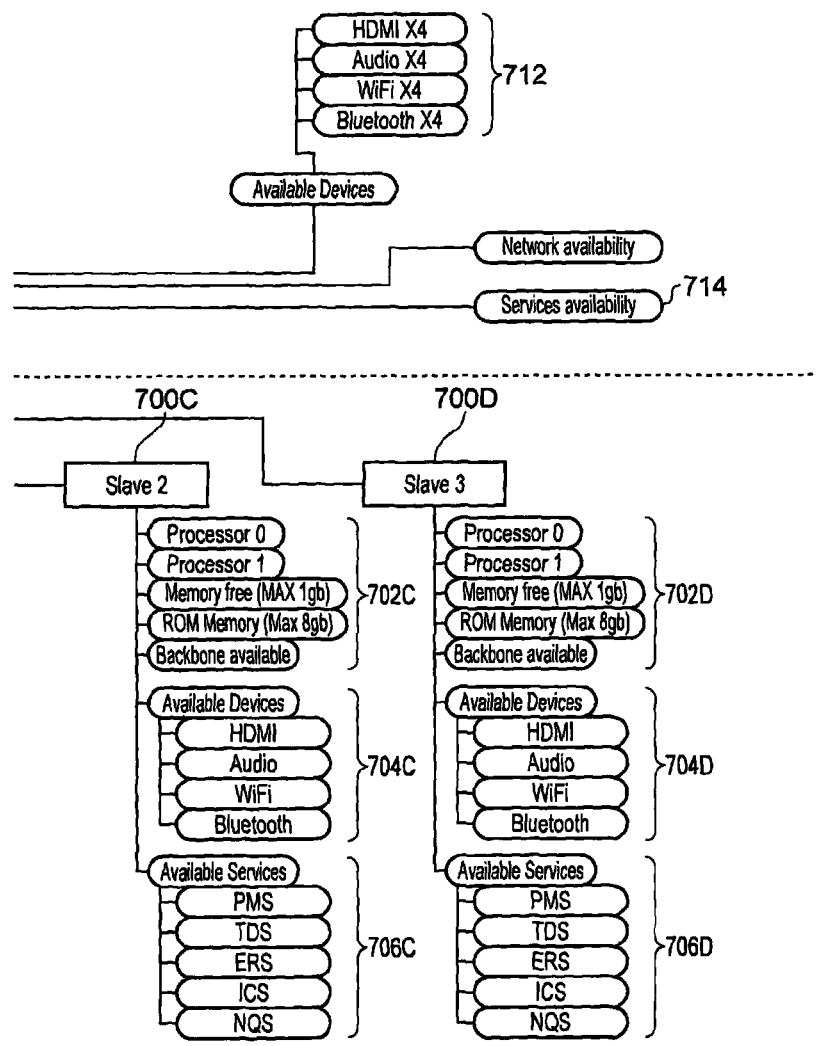

FIG. 7 is a diagram showing both the logical and physical elements of the network. The diagram is divided into logical devices and physical devices. The physical devices include the resources local to the master terminal (the local device 700A) and the resources of the slave devices 700B-D. The logical devices include equivalents to all of the physical devices, but they are represented as a pool of resources. Each device includes physical core devices 702A-D, physical devices 704A-D and physical services 706A-D. These physical elements are represented as logical processors 708, logical memory 710, logical devices 712 and logical services 714.

Figure 8:
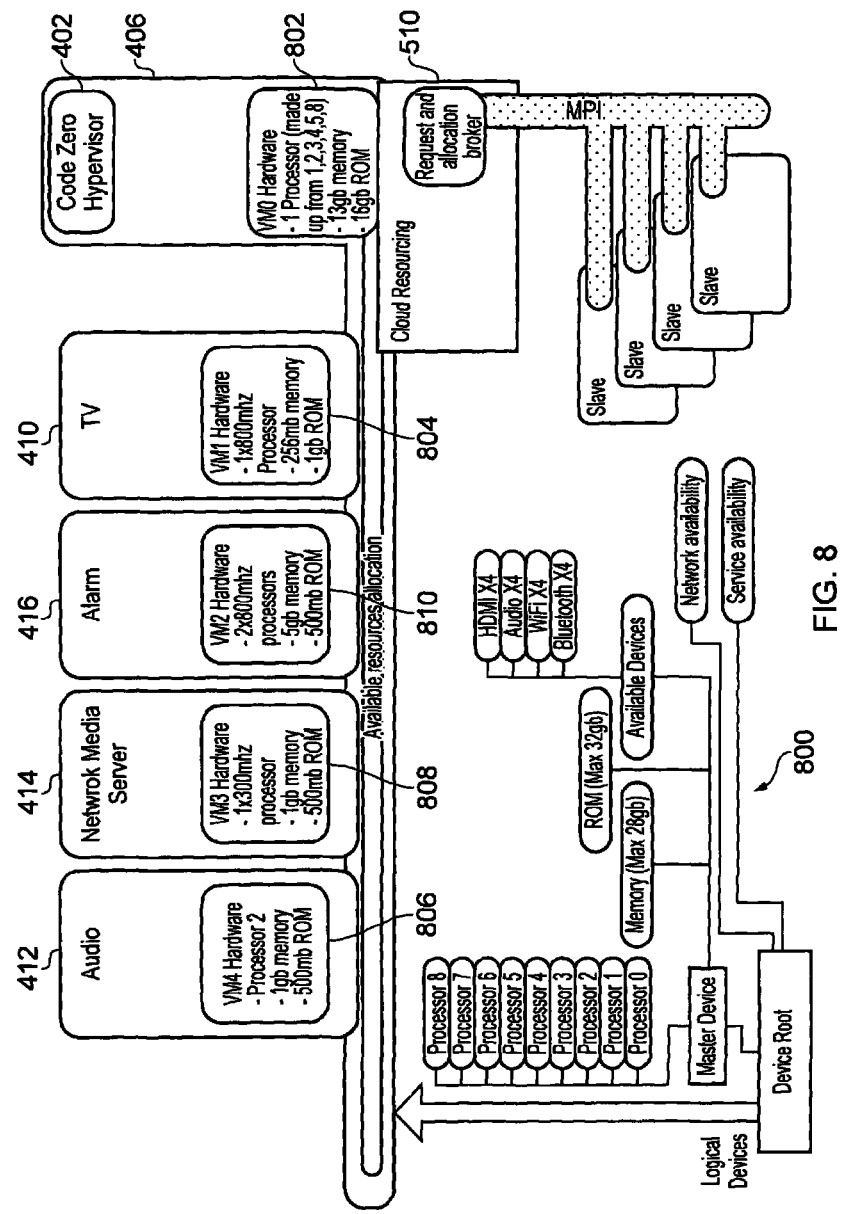
FIG. 8 is a diagram of the requirements for the virtual machines for use with the operating system of FIG. 4.

When a VM requires a resource, it makes a request to the VM resourcing engine 540 in the HARD 404. The VM then gets a resource envelope to run within. FIG. 8 is a diagram showing how the HARD 404 supports the virtual machines. All of the devices that are available are pooled into a tree of resources 800 that the cloud resourcing module 510 can allocate to VM zero 406. The resource allocation is selected by the system as 85% of the total resources goes to the controlling virtual machine by default. This can be redefined through a configuration interface (not shown). Once this is set the virtual machine zero 406 is started up. This makes the cloud resourcing service start to create connections to the slave terminals through MPI and named pipes.

As can be seen in FIG. 8, each VM has a hardware requirement list. The VM0 406 has a list 802 which specifies one processor, 13 Gb of memory and 16 Gb of ROM. The VM1 410 has a list 804 which specifies one processor, 256 Mb of memory and 1 Gb of ROM. The VM4 412 has a list 806 which specifies one processor, 1 Gb of memory and 500 Mb of ROM. The VM3 414 has a list 808 which specifies one processor, 1 Gb of memory. and 500 Mb of ROM. The VM2 416 has a list 810 which specifies two processors, 5 Gb of memory and 500 Mb of ROM.

Figure 9:
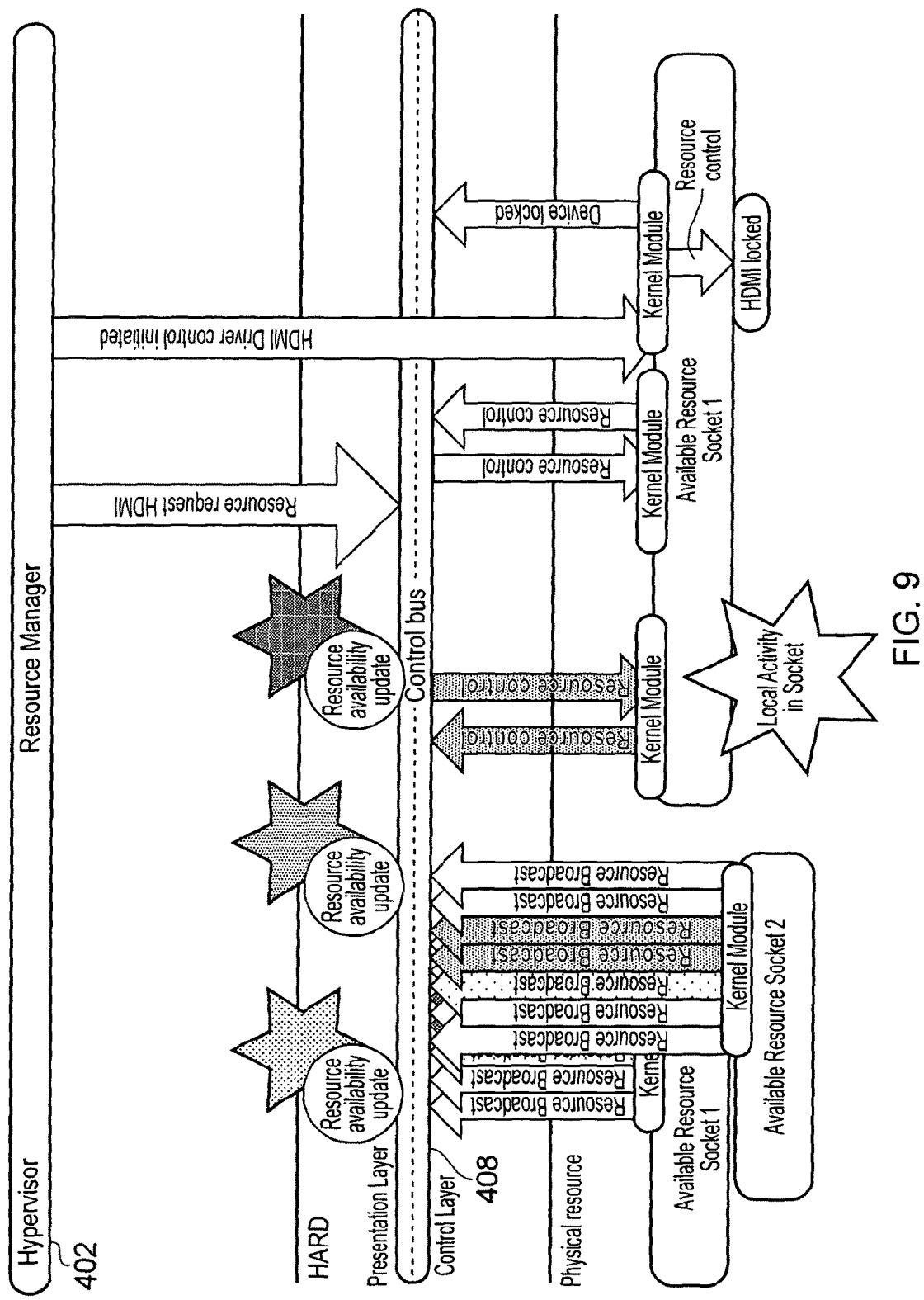
FIG. 9 is a flow diagram showing a method of operation of the operating system of FIG. 4.
Figure 10:
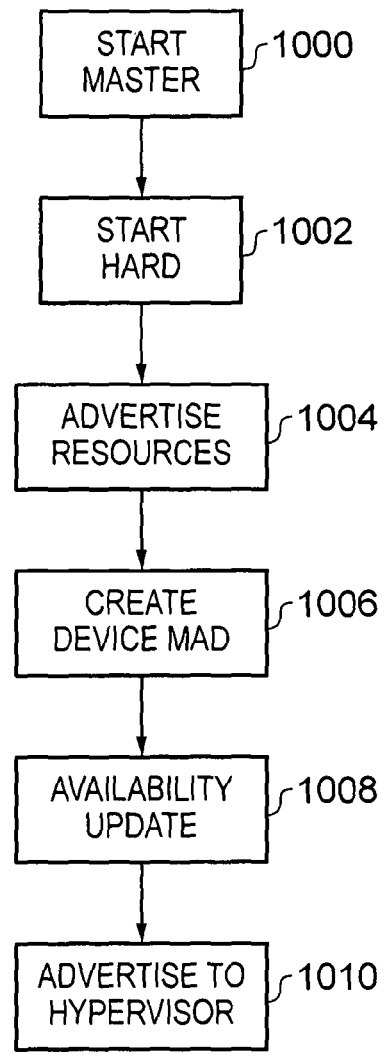
FIG. 10 is a flow diagram showing a further method of operation of the operating system of FIG. 4.

The operation of the network 10 will now be described in more detail. FIG. 9 is a flow diagram which shows how resources demonstrate their availability and how resources are requested and used. The process of starting up the network will be described with reference to FIG. 10. As noted above, when all of the terminals have powered up, the one with the lowest serial number becomes the master terminal (block 1000). The HARD 404 then starts as a kernel process (block 1002). This process uses one of the cores in the processor of the CPU 306A in the master terminal 108A. At this point all of the slave terminals advertise their availability of their services by XML (block 1004). These XML messages are registered by the HARD 404 and it creates a device map (block 1006). As can be seen in FIG. 9, each terminal broadcasts its resources to the control layer 408 of the HARD 404. This is carried very frequently. Each time resource availability is updated (block 1008), the HARD 404 advertises this to the hypervisor 402 (block 1010). When a local activity in a terminal uses a resource, the HARD 404 is informed and the resource is no longer listed as available.

Figure 11:
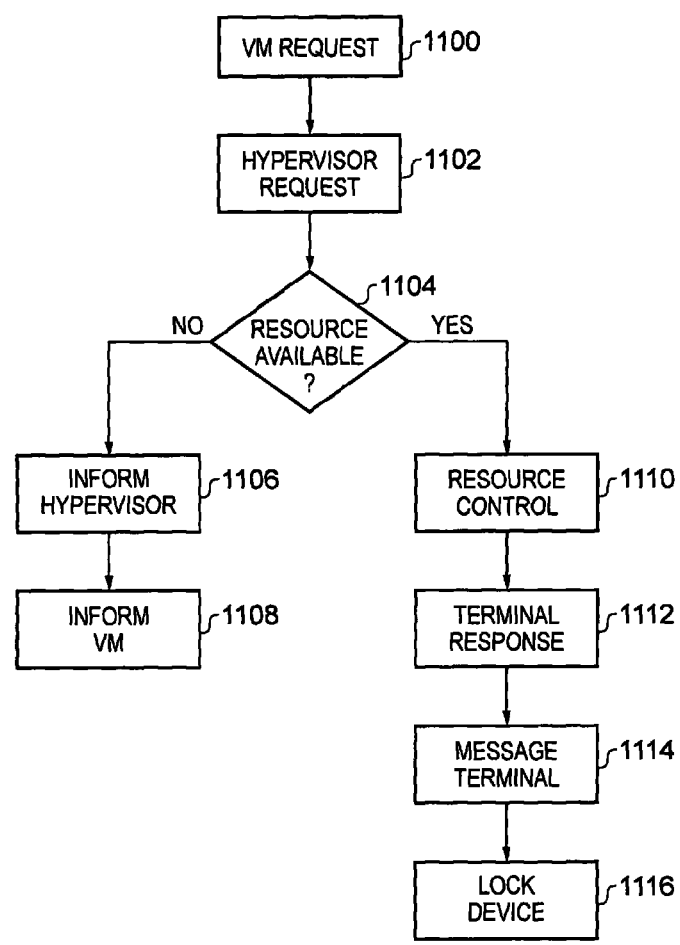
FIG. 11 is a flow diagram showing a further method of operation of the operating system of FIG. 4.

The process of a VM acquiring a resource will now be described with reference to FIG. 11. When a VM requires a resource, the VM makes a request to the hypervisor 402 (block 1100). The hypervisor 402 then makes a request to the control layer 408 of the HARD 404 for that resource (block 1102). The HARD 404 checks to see if that resource is available (block 1104). If the resource is not available, the HARD 404 informs the hypervisor 402 (block 1106), which in turn informs the VM making the request (block 1108). If the resource is available, the HARD 404 sends a resource control message to the kernel module on the relevant terminal (block 1110). The terminal then sends back a response to the HARD 404 (block 1112). The hypervisor 402 then initiates resource control and messages the kernel in the terminal directly (block 1114). The terminal then sends a "device locked" message to the HARD 404 (block 1116).

The basis of the HARD 404 is a hierarchical kernel structure of master and slave based upon kernel drivers for Android™. The master kernel supports the major functions and, to the hypervisor 402, looks like one large machine that reports an array of hardware (i.e. a compound of all of the terminals hardware). In order to make a multi-system environment like this work, there is a requirement for messaging stacks that allow for virtual memory and device sharing, so that all kernels understand what can and cannot be utilised. To this end, when a process running on top of the master kernel makes a libc fork( ) call, the resulting child process will be created on a slave unit with appropriately low utilization through the HARD 404. The HARD 404 captures the resource allocation. The HARD 404 then it monitors it for performance and decay through the allocations lifecycle. The slave terminal runs that process and reports the child's return status to the master kernel, which passes it back to the original parent (hypervisor based virtual machine) transparently through a driver connection. If the virtual machine is shutdown or is frozen the status is captured and the master kernel sends a sig term to the slaves to close connections.

In this way, the first process in the virtual machine called init, will be running on top of the master kernel but all subsequent processes may be running on any one of several slave kernels in one of the terminals. The memory constraint for multi device management would be done with an adaptation to MMAP [? need to define?] which allows HARD to map the kernel memory and all of the slave unit memory.

The MPI mentioned above creates logical extensions for MMAP and fork, re-spawn, socket open close etc. that can span multiple devices. MPI comes from the parallel supercomputer industry. This means that the master socket can treat all slaves' sockets like they are all part of the same machine.

For resources that need a dedicated feed, resources can be explicitly named in the virtual machine when the setup for that VM has been added (such as a hard disk, ODU connector, one HDMI and IPAD control for the television VM). In this case when the resourcing of the new VM is being reviewed, specific devices can be specified in the virtual machine template. When the virtual machine starts, the VM resourcing manager 540 requests 100% utilisation of the named devices. The cloud resourcing engine 510 uses MPI to create dedicated pipes to each of the sockets where the resources reside and these pipes are joined to the VM through the VM resourcing manager 540. Once this has been completed, these devices will be shown as un-usable to all other VM's.

In the communication from the VMs to the physical hardware, the requests and responses are done using named pipes that are set up and cleared down with the MPI. Once the clear down is complete the resources are re-advertised to other VM's. So in effect what goes in from the hypervisor 402 comes out in the socket and vice versa.

The local service portion is another unique aspect of the network 100, and is how the terminals are managed. One of the reasons for using a new MPI process is because in a traditional parallel computing environment, the MPI and the subroutines there within are holistic over the slave system. In a supercomputing cluster there are two to three master nodes that produce results and thousands of slave nodes whose job it is to provide the raw processing power whereas in the network 100 there is only one master node.

The local processing units in all of the terminals provide two functions: Firstly, they make sure that the local terminals work and can handle end point requests such as WiFI or Bluetooth requests, manage the PLC driver, check storage and other housekeeping functions. Secondly, they provide arrays of local information where data is processed locally. An interface in the terminal allows for indiscriminate requests for the information to be made by third parties. Such information would be IP camera footage where processing only happens if there was a visible change to the frame (someone walked into the room) or reading power information from the socket and sending the result to a virtual machine as a digest once per day.

Some of these activities require processing power all of the time to process the information coming in (for example, video frames in a busy room when capturing video). Some of them require processing power in one-off bursts (for example on a daily basis) such as power reading digests or graphing from a 24 hour period of reading. There are a number of services in local processing. The examples shown in FIGS. 5 and 6 are as follows:

PMS—Power Meter Service: This service reads power from the 13 amp outlets in the sockets 202A-D to measure the pull from each socket.

TDS—Thermal Data Service: This service works with a thermal probe in each terminal 108A-D giving a constant ambient temperature of the room it is present in.

ERS—Error Reporting Service: This service watches the local terminal for errors and has a configurable regex array that can allow the service to make change to the terminal based upon error output. (for example, meter malfunction).

ICS—Image Collection Service: The image collection service is for pulling video and still images from cameras plugged into the sockets 202A-D (instigated based upon USB camera that is supported or slave wall or lighting unit). It processes video frames where something has changed (the notion being that if nothing in a room has changed there is no difference in the video frame).

NQS—Network Quality Service: This service monitors the powerline and WiFi networks to measure quality and how well it is doing against the set benchmark (floating average).

All of these services are preferably present in each terminal 108A-D. Each service requires its own resources in variable amounts and so will require the terminal to refactor its resourcing to the HARD 404 VM resourcing service 540 at the point where it needs to use more capacity. In general (bar VM communication) local resourcing should get priority over VM based applications.

Figure 12:
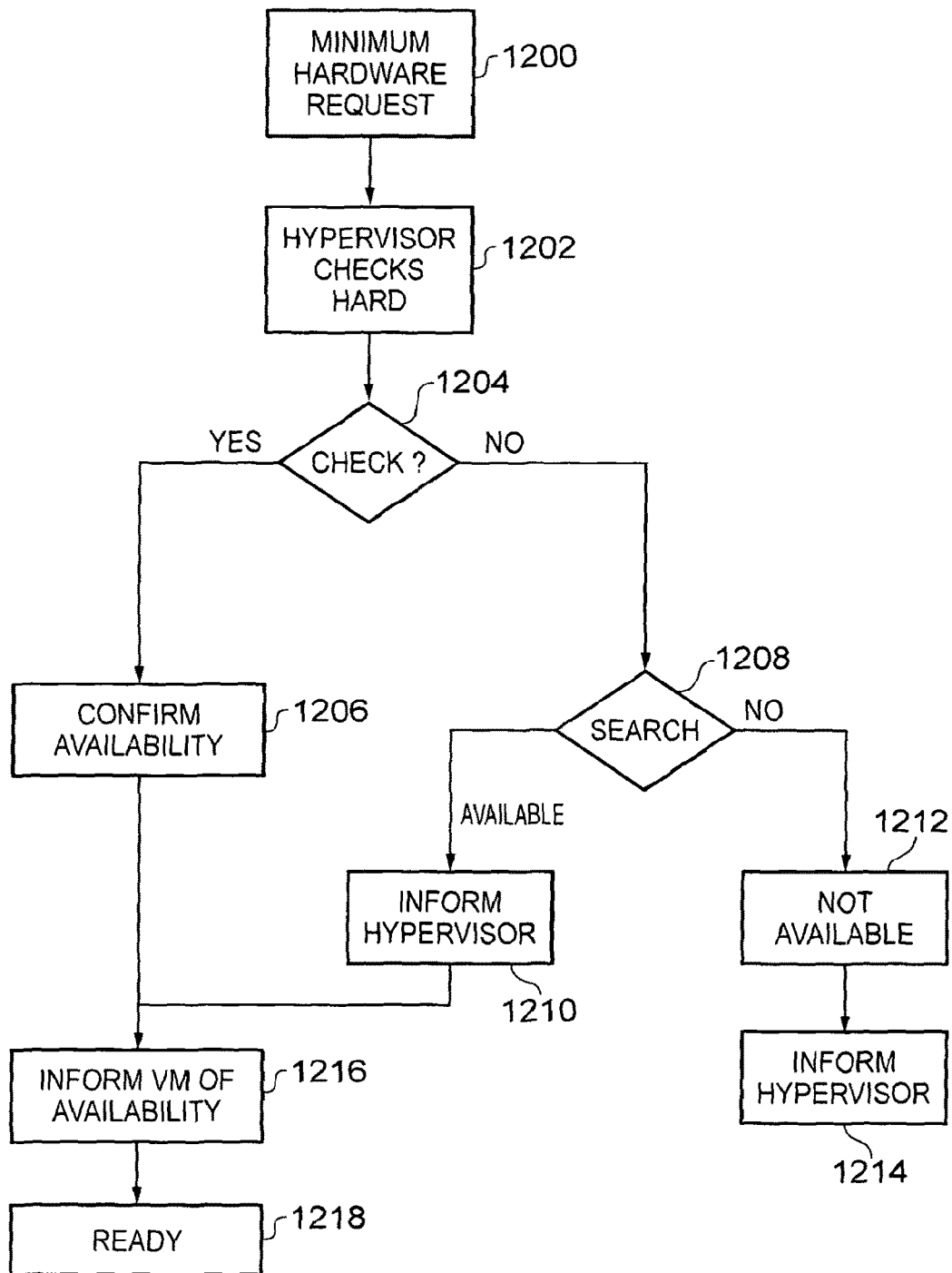
FIG. 12 is a flow diagram showing a further method of operation of the operating system of FIG. 4.

The operation of the network 10 will now be described, with reference to various examples. The first example relates to the use of the satellite television VM 410, and will be described with reference to FIG. 12. When the satellite television VM 410 is initiated, it sends a request to the hypervisor 402, to establish the presence of the minimum hardware required to run the VM 410 (block 1200). Specifically, the satellite television VM 406 sends a request to the hypervisor 402 for a satellite video feed, a storage device, and a television output. The hypervisor 402 sends a request to the HARD 404 for the required hardware items (block 1202). The HARD 404 checks the service catalogue to establish whether or not the required resources are available (block 1204). In the present case, the satellite dish 110 is connected to cartridge 114, the NAS 116 is connected to data port 208A, and the television 118 is connected to the television out port 206A. These resources are all listed in the service catalogue and accordingly the HARD 404 informs the hypervisor 402 that the required resources are available (block 1206). In the event that the service catalogue does not list a particular resource, the HARD 404 conducts a search of the various inputs to check if the requested resource is in fact available (block 1208). If the resource is in fact available, the HARD 404 updates the service catalogue and informs the hypervisor 402 that the resource is available (block 1210). If the resource is not available, the HARD 404 informs the hypervisor 402 that the resource is not available (block 1212). In this case, the hypervisor 402 informs the VM 410 that the required resources are not available, and this is reported to the user, for example via the television screen (block 1214). In this example, the resources are available, and the hypervisor 402 then sends a signal to the satellite television VM 406 informing it that required hardware is available (block 1216). The satellite television VM 406 is then ready to be used (block 1218).

When first initiated, the satellite television VM 410 enters normal television mode, in which a default satellite television channel is forwarded from the satellite dish 110 to the television 118 over the power line network 100. Using a remote control (not shown), the user is able to control the satellite television VM 410 to change the channel present on the television 118. As an alternative, or in addition to presenting a television signal on the television 118, the channel being watched (or another channel) may be recorded to the NAS 116. The user may then watch a television program stored on the NAS 116 on the television. In this case, the video is transmitted over the power line network 100 to the television from the NAS 116.

The above-described is equivalent to creating a virtual satellite television set-top box. Rather than using a set-top box, having all the required hardware and software, the operating system is taken out of the box and defined as a virtual machine.

In some cases, the satellite television provider may wish to prohibit or restrict certain functionality. For example, the provider may wish to restrict multi-room capability to those who have paid for that service. Accordingly, the satellite television VM 406 may be arranged so that when a user wants to watch television in another room, they select another HDMI port using a remote device. This action sends a request to the satellite television provider for confirmation that a user has subscribed to this service. If so, the provider sends a signal to the VM informing it that a user may perform this operation. The VM 410 may enable more than one person to watch satellite television simultaneously in different rooms. In such cases, the satellite television VM 410 arranges, via the hypervisor 402 for the signal to be sent via the most efficient optimum route using the distributed processor network to various HDMI ports on several network terminals. The VM 410 checks the permitted level of multi-room usage e.g. simultaneous streaming of a television signal to x users.

In the next example, the operation of the audio player VM 412 will be described. This VM is for allowing a user to play music over the speakers 120, 122. This may be done by streaming music from the Internet, or by playing music from the NAS 116, over the power line network 100. On start-up, the VM 412 sends a request to the hypervisor for the required hardware. In this case, the VM 412 requires at least one speaker, and at least one audio source. In this case, the HARD 404 reports the availability of NAS 116 and speakers 120, 122. Furthermore, the HARD 404 reports the availability of television 118 which may be used by the user as a graphical user interface for the VM. The user then selects via the television what music they wish to listen to, and which speaker they wish to play it over. Audio signals are then communicated over the network 100 by the hypervisor 402 in a manner which selects the most efficient route from source to speaker. This all occurs over the power line network 100. If a network terminal includes a Bluetooth unit, then the music may be played over a pair of Bluetooth headphones.

In a further example, a security VM 416 may be provided. Rather than them putting a standalone security device in a building, a security virtual machine is provided. The security VM is arranged to access cameras, Bluetooth devices, Nox and O2 sensors, door and window alarms, lighting controls (person home simulation) and localised third party devices such as movement sensors etc connected to the network. This virtual machine owns or partially owns the devices and also gets a VPN (virtual private network) link back to a security company for monitoring.

In a further example, an energy VM may be provided. This virtual machine would have access to the sockets to measure current draw and usage, heat and humidity, lighting services and external temperature (either using an external socket or third party weather station). The energy VM can pull all of the power measurements together and an energy company can use this information to inform about savings or change the customers plan to suit their needs. If the customer is generating electricity this system can also pull that information too from the generation device, this virtual machine runs a secure VPN back to the energy company but has a local web interface to show how the customer is doing. It's possible that some interfaces might need to be locked to this service for security of feed of data. This service can also interface to a private Bluetooth Piconet in which the gas meter, water meter and electricity meter are present. This private Piconet gives the energy company the ability to do real time analysis of the customer's usage and notify as needed either locally or via phone.

A further example, would be a distributed video and music storage VM. In this case, an application may be placed on all of the computers in the network and the distributed sockets will treat all of the music on each computer as a central pool of music, video and pictures creating a virtual drive of all of the information for each subscriber. It does this by utilizing a virtual machine that reads and indexes all of the media that each client sees and then creates a virtual drive of all of that information for all of the other machines to see. There is also an option to pull and store of third party devices (plug-in Network attached storage or USB based drive) so that all media is check and hosted centrally. When a device is queried and asked for its contents it triggers a sharing request so that it gets shared as a central resource.

As can be seen above, the hypervisor 402 behaves like a single platform. While all the ports and other units are distributed over the network terminals 108A-108D, they are presented to the hypervisor 402 as resources of a single machine.

Some of the devices connected to the network 100 act as resources. For example, a video camera providing a video stream is a resource. There are two primary types of resource. Firstly, there are passive resources. These are resources that make a particular service available to the network. For example, a one-way video feed or a reading from a measurement device. Secondly, there are interactive resources. These are resources that may be controlled in some way. For example, a user-controllable video camera for use in a security application is an interactive resource. The HARD 404 determines the type of resource and reports this up to the hypervisor 402.

When a VM requires access to a passive resource, it makes a request for access to the resource to the HARD 404. The HARD 404 loads a virtual driver in response to the VM request. For example, a VM may request access to a video feed. The virtual driver captures the video feed from the camera input and processes the video locally i.e. at the network terminal directly connected to the camera input. Processing may be based on rules such as only capturing video when movement is detected. The virtual driver pushes the data up through HARD 404 to the VM. Such local processing has the advantage of not using bandwidth between, for example, a central terminal with an operating system and slave terminals, thereby freeing up bandwidth for use for other applications.

When a VM requires access to an interactive resource, it must request sole use of the resource. For example, this may be done for a security application or for electrical supply monitoring. In these cases, the HARD 404 allocates the entire resource to the specified VM and locks the resource. The HARD 404 continues to monitor how the resource is being used to make sure the VM is getting the access it requires. Accordingly, the resource is connected directly to the VM and the resource is unavailable to other VMs.

For the VMs 406-416 to work effectively, the HARD 404 needs to validate and publish all of the connectivity options that can be made from each of the power socket fascias 200A-200D as well as the supporting service to the hypervisor 402. This is done using an API (Application Programming Interface) which the hypervisor 402 uses to communicate with the HARD 404. The HARD 404 also needs to be able to show whether the device is physically present on the hardware or a virtual device/shared resource in order to be able to generate a HAL (Hardware Abstraction Layer). All of the sockets publish their own list of devices and resources to the master network terminal 108A. The master terminal 108A then controls what is available through the HAL. When a processing request or network request comes down through the hypervisor 402 into the HAL the master terminal 108A allocates the resource that needs to process it through the master as it controls all of the streams. This could be a video feed or a Bluetooth connection request.

The operating system 400 is designed to handle the situation in which the master terminal stops working. Each terminal 108A-D maintains a capability table where the capabilities of every other terminal are listed. The table maintains ID information, available physical resources, available logical resources and the current state of each resource. The master terminal clocks each of the slave sockets every 20 seconds in order to attain this information. In return, the master terminal outputs information about its own resources and status, and this is stored in shared capability table. This table is shared between the terminals.

When the terminals are powered up, the terminal with the lowest serial number is nominated as the master terminal, as described above. The master terminal sends a request to all of the other terminals and builds the shared capability table. When at least one response has been received by the master terminal, the master terminal nominates, from the shared table, a secondary terminal. The secondary terminal loads the master terminal's software, but leaves it inactive. The master terminal may change the secondary terminal as it receives information from the other terminals. This decision is based on terminal load and ongoing capabilities of a terminal. If the nominated secondary terminal is currently conducting sustained local processing, then it would no longer be a suitable candidate to act as the secondary terminal.

The master terminal nominates a secondary terminal by sending an instruction packet the secondary terminal which has been chosen. The secondary terminal then responds confirming that it is the new secondary.

The secondary terminal will become the master terminal if no updates are received from the master within 90 seconds. If this happens, the secondary terminal asks the master terminal if it is still alive. This is done in case the master has entered a suspended state. Based on any responses received, or lack thereof, and any extra information received, the secondary terminal takes over as the master terminal and rebroadcasts the last state message that it received. This tells all of the other terminals that the secondary terminal has become the master terminal. Once it has received an update from the other nodes it then nominates a new secondary.

The HARD 404 has a service layer (not shown) that it will use for common tasks on the network 100. The service layer includes local socket information and a control layer 408 to enable the VMs to also use the networked entity as well as direct communications.

In the above described embodiments, we described some of the different virtual machines which may be used with the network. In the following, some examples of services which are integral to the network are described.

The network 100 may provide location based services. For example, each network terminal may include a Bluetooth unit. This can be used to track objects which have Bluetooth connectivity as they move around the building. In a more advanced embodiment, triangulation may be used to determine a more precise location of an object. For example, receive signal strength indicator (RSSI) and a piconet may be used to measure the distance between the Bluetooth antenna and a given Bluetooth object. The HARD 404 maintains a location log of any objects which it is tracking. This way, if a VM asks for the location of an object, it gets the same answer as any other VM. Any VM may make a request to the HARD 404 for the position of a given object, The network 100 may also provide power monitoring services. Each network terminal 108A-108D includes a power measurement unit (not shown). This may be used to determine if a device is on or off, broken or alive, and also how much power it is consuming.

The network may also include an environmental monitor. Each terminal will have a basic sensor array which records temperature, humidity and moisture. This information will be published to the hypervisor as a table listing each socket and denoting its temperature and moisture level, giving a view of the home environment.

The HARD 404 is responsible for software management across all of the network terminals 108A-108D. It is responsible for knowing what version of software each socket is running and also what cartridges are available in each network terminal. For example, it stores information about the version and revision of the components of each terminal. The HARD 404 publishes this information to the hypervisor 402 so that any VM can see what versions of different resources are available. This information is also used to perform software upgrades.

The HARD 404 will also know if there are dumb devices on the network that will also be available to be managed or controlled such as disk packs over USB, network-attached storage (NAS), storage area network (SAN), printers and multifunction machines (for example, common unix printing system (CUPS)) and even special devices. For example, there might be a need for information files about specific devices to be given to the HARD 404 e.g. RFID based cat flap.

The HARD 404 manages QoS (Quality of Service) across the network 100 in an industry standard way using the powerline backplane. Different services are assigned different bands. For example, there are bands for TV, telephony, Internet, mail etc. Internal request are allocated separate bands to manage other important resource requests. These quality bands can be changed based upon VM installation but need to be managed but the controller.

Each network terminal is set up to do localised processing, outside of the virtual environment described above. This is a useful part of the network 100 because some of the interfaces through the HARD 404 can allow streams of data to VMs. However some of the streams have the potential of being large (5 to 10 Mb or more) and so its useful that in the case where local processing looks at the streams local to the socket and works out the value of change. If there is no change then an update is not sent. In the case of a video stream from a security camera it would be useful for the local socket controlling the stream to be able to process and discard the video frames unless there is change. Once a change occurs that change is sent and stored in the requesting VM as a streamed update. This leaves the network less congested if there are multiple events going on at the same time.

In a preferred embodiment, the network 100 is arranged to monitor what devices are plugged into the power socket 202. A plug (not shown) attached to the power cable of an appliance (such as a hair dryer or fridge) has an RFID tag attached to it. Each network terminal 108A-108D has an RFID reader unit. The HARD 404 includes an application that monitors all of the RFID devices plugged into the sockets 202. When an appliance is to be monitored, an RFID is affixed to the plug of the device and the serial number of the tag is read. The application is then provided with the serial number of the device and a description of the devices it is attached to. This could be a fridge, a hair dryer, a charger or a TV. The network terminals are then able to determine when an appliance is plugged into the socket. When the appliance is plugged in, the network determines which socket the appliance is plugged in to. The HARD 404 can then determine what appliances are on and what current they are drawing. This information can then be stored and used by the various VMs such as the energy monitor mentioned above.

What is claimed is:

1. A power line communication network, comprising:
a plurality of network terminals and at least one power line, wherein each terminal is coupled to said at least one power line such that the terminals are interconnected, and each terminal comprises:
   a power line interface, for transferring signals to and from said at least one power line and between said terminals;
   at least one processor and at least one memory, wherein said processor is for processing computer code and said memory is for storing computer code; and
   a plurality of resources, wherein said resources include at least one signal input and/or signal output;
wherein at least one of said terminals further comprises
   a power socket fascia that includes at least one power socket, the power socket being coupled to said at least one power line, and wherein at least one of said terminals has computer code stored thereon and the computer code includes an operating system for controlling the power line communication network, the operating system including:
   a control layer for controlling access to said at least one processor, said at least one memory and said resources of each terminal;
   a virtual machine interface through which virtual machines can access said resources;
   a virtual machine manager for controlling access by virtual machines to said resources, wherein said virtual machine manager accesses said resources through the control layer; and
   a hardware abstraction and resource distributor, wherein said hardware abstraction and resource distributor includes said control layer and a resource catalogue.

2. A power line communication network according to claim 1, wherein the control layer distributes processing of elements of said operating system across said processors.

3. A power line communication network according to claim 2, wherein processing of the virtual machine manager is distributed across said processors.

4. A power line communication network according to claim 1, wherein the control layer distributes processing of virtual machines across said processors.

5. A power line communication network according to claim 1, wherein the control layer distributes memory access across said memory.

6. A power line communication network according to claim 1, wherein said terminals report an availability of resources to said control layer.

7. A power line communication network according to claim 6, wherein said control layer maintains the resource catalogue, and the resource catalogue includes the available resources.

8. A power line communication network according to claim 6, wherein the control layer reports the availability of resources to the virtual machine manager.

9. A power line communication network according to claim 1, wherein said terminals each further comprise a power socket fascia.

10. A power line communication network according to claim 9, wherein the fascia includes at least one power socket, the power socket being coupled to said at least one power line.

11. A power line communication network according to claim 10, wherein said power socket facia includes at least one port, coupled to said at least one signal input and/or output.

12. A power line communication network according to claim 1, further comprising at least one virtual machine, arranged to communicate with said virtual machine manager via said virtual machine interface.

13. A power line communication network according to claim 12, wherein said at least one virtual machine is a signal controller, arranged to cause a signal received from a signal input of one of said terminals to be transmitted to a signal output of one of said terminals.

14. A network terminal for use in a power line communications network comprising:
a power line interface, for transferring signals to and from a power line;
at least one processor and at least one memory, wherein said processor is for processing computer code and said memory is for storing computer code; and
a plurality of resources, wherein said resources include at least one signal input and/or signal output;
wherein said terminal further comprises a power socket fascia that includes at least one power socket, the power socket being coupled to said power line;
wherein said processor is arranged to process computer code which includes an operating system for controlling the power line communications network, the operating system including:
   a control layer for controlling access to said at least one processor, said at least one memory and said resources of a terminal;
   a hardware abstraction and resource distributor, wherein said hardware abstraction and resource distributor includes said control layer and a resource catalogue;
   a virtual machine interface through which virtual machines can access said resources; and a virtual machine manager for controlling access by virtual machines to said resources, wherein said virtual machine manager accesses said resources through the control layer.

* * * * *